United States Patent [19]

Franke et al.

[11] 4,239,650

[45] Dec. 16, 1980

[54] PROCESS FOR THE MANUFACTURE OF A MIXED CATALYST

[75] Inventors: Rainer Franke, Frankfurt am Main; Bernd Diedrich, Eschborn, both of Fed. Rep. of Germany

[73] Assignee: Hoechst Aktiengesellschaft, Frankfurt am Main, Fed. Rep. of Germany

[21] Appl. No.: 963,320

[22] Filed: Nov. 24, 1978

[30] Foreign Application Priority Data

Nov. 25, 1977 [DE] Fed. Rep. of Germany ....... 2752577

[51] Int. Cl.$^3$ .............................................. C08F 4/64
[52] U.S. Cl. ............................ 252/429 B; 252/429 C; 526/119; 526/124; 526/127
[58] Field of Search ........................ 252/429 B, 429 C

[56] References Cited

U.S. PATENT DOCUMENTS

| | | | |
|---|---|---|---|
| 3,094,568 | 6/1963 | Hay et al. | 252/429 B X |
| 3,901,863 | 8/1975 | Berger et al. | 252/429 C X |
| 3,951,935 | 4/1976 | Engelmann | 252/429 C X |

FOREIGN PATENT DOCUMENTS

| | | |
|---|---|---|
| 2146685 | 4/1972 | Fed. Rep. of Germany . |
| 2111455 | 9/1972 | Fed. Rep. of Germany . |
| 2259516 | 6/1973 | Fed. Rep. of Germany . |
| 2329641 | 12/1974 | Fed. Rep. of Germany . |
| 2455415 | 5/1975 | Fed. Rep. of Germany . |

*Primary Examiner*—Patrick Garvin
*Attorney, Agent, or Firm*—Curtis, Morris & Safford

[57] ABSTRACT

The high activity rate of known polymerization catalysts on the basis of metal alcoholates can be considerably increased by after-treating these catalysts with acid halides of the 3rd or 4th main group or the 4th subgroup of the Periodic Table.

20 Claims, No Drawings

PROCESS FOR THE MANUFACTURE OF A MIXED CATALYST

Polymerization catalysts which are formed by reaction of magnesium alcoholates and/or complex magnesium alcoholates with transition metal halides are well known (German Auslegeschrift No. 1,795,197; German Offenlegungsschrift No. 2,000,566; German Patent No. 1,957,679), and in the polymerization of 1-olefins, they give very high catalyst yields.

There have been described, furthermore, polymerization catalysts which are obtained by simultaneous reaction of titanium esters free from chlorine and acid halides with magnesium alcoholates (see German Offenlegungsschrift No. 2,111,455), which are likewise distinguished by a very high activity rate.

There are known other polymerization catalysts, which are formed by reaction of magnesium alcoholates with aluminumalkyl halides and subsequent reaction with titanium halides (see German Offenlegungsschrift No. 2,123,356), as well as those polymerization catalysts obtained by reaction of magnesium alcoholates with titanium esters and aluminum halides (see German Offenlegungsschrift No. 2,259,516), and, furthermore, polymerization catalysts produced by reaction of magnesium alcoholates with halogenation agents such as HCl, $SOCl_2$, $NH_4Cl$, etc. and subsequent reaction with titanium compounds (see German Offenlegungsschrift No. 2,146,685).

All three kinds of catalysts excel by their high activity rate.

It has now been found that this excellent activity of the known polymerization catalysts produced from metal alcoholates can be considerably increased by after-treating them with acid halides of the 3rd or 4th main group, or the 4th subgroup of the Periodic Table.

The subject of the invention is therefore a process for the manufacture of a mixed catalyst consisting of a compound containing a transition metal (component A) and an activator (component B) by reaction of a transition metal compound with a metal alcoholate and mixture of the reaction product with the activator, which comprises reacting the solid product of the transition metal compound/metal alcoholate reaction which is insoluble in hydrocarbons, with an acid halide in order to prepare component A.

The subject of the invention is furthermore the catalyst prepared according to this process, and the use thereof for the polymerization of 1-olefins.

In order to obtain component A, a metal alcoholate is first reacted with a halogen-containing titanium(IV) compound, thus forming component A which subsequently is reacted with an acid halide.

Suitable metal alcoholates are those of the formula $$[Me^1{}_x(OR)_v]Me^2{}_yMe^3{}_zH_w,$$

in which $Me^1$, $Me^2$, $Me^3$ which are the same or different each is a metal of main group I, II, III or IV or subgroup I, II, IV or V of the Periodic Table of the elements, preferably Li, Na, K, Mg, Ca, Al, Si, Ti or Zr, especially Mg, Al, Si, Ti or Zr; R is a hydrocarbon radical having from 1 to 20, preferably 1 to 6, carbon atoms, especially an alkyl radical having from 1 to 6 carbon atoms; x is an integer of from 1 to 5; y is an integer of from zero to 2; z is an integer of from zero to 2; v is an integer of from 2 to 8; and w is either zero or 1, with the proviso that (valency $Me^1$)·x + (valency $Me^2$)·y + (valency $Me^3$)·z + w equals v.

The simple metal alcoholates (w, y, and z in the above formula = zero) are prepared according to known methods. For example, the metal can be reacted with the anhydrous alcohol, or an alcoholate of a low molecular weight alcohol can be reacted with a high molecular weight alcohol, or a double reaction of an alkali metal alcoholate and an anhydrous metal halide can be carried out.

Preferred simple metal alcoholates are those of magnesium, for example $Mg(OC_2H_5)_2$, $Mg(OiC_3H_7)_2$, $Mg(OiC_4H_9)_2$, or Mg phenolate.

The complex metal alcoholates (alkoxo salts) are also prepared according to known methods (lit.: Meerwein, Ann., 455, p. 227 (1927); 476 p. 113 (1929); Houben-Weyl, Methoden der organischen Chemie, Vol. 6/2, p. 30); the following are examples:

(1) Two metal alcoholates are allowed to react in a suitable solvent for example $$Ti(OR)_4 + Mg(OR)_2 \rightarrow Mg[Ti(OR)_6]$$

(2) A metal is dissolved in an alcoholic solution of a metal alcoholate:

$$LiOR + Al + 3ROH \rightarrow [Al(OR)_4]Li + 1.5H_2$$

(3) Two metals are simultaneously dissolved in alcohol:

$$8 ROH + Mg + 2Al \rightarrow [Al_2(OR)_8]Mg + 4H_2$$

(4) The alkoxo acids which are the precursors of the complex metal alcoholates are neutralized with a metal alcoholate of alkaline reaction in an alcoholic solution, for example:

$$H_2[Ti(OR)_6] + LiOR \rightarrow LiH[Ti(OR)_6] + ROH$$

$$LiH[Ti(OR_6] + LiOR \rightarrow Li_2[Ti(OR)_6] + ROH$$

(5) Double reaction of the alkali metal salts of alkoxo acids with anhydrous metal chlorides:

$$ZrCl_4 + 6NaOR + \xrightarrow{ROH} [Zr(OR)_6]Na_2 + 4NaCl$$

$$ZrCl_4 + 3MgOR + \xrightarrow{ROH} [Zr(OR)_6]Mg + 2MgCl$$

For the preparation of the complex metal alcoholates, there may be used for example the following metal alcoholates:
$Li(OiC_3H_7)$; $Mg(OC_2H_5)_2$; $Mg(OiC_3H_7)_2$; $Al(OiC_3H_7)_3$; $Al(OsecC_4H_9)_3$, $B(OiC_3H_7)_3$; $Si(OC_2H_5)_4$; $Ti(OiC_3H_7)_4$; $Ti(O(CH_2)_2O-)_2$; $Zr(OiC_3H_7)_4$.

Examples of complex metal alcoholates are:
$[Mg(OiC_3H_7)_4]Li_2$; $[Al_2(OiC_3H_7)_8]Mg$; $[Si(OR)_6]Mg$; $[Zr(OiC_3H_7)_6]Mg$; $[Ti(OC_2H_5)_6]Mg$; $[Mg(OC_4H_9)_4]Na_2$; $[Mg(OC_2H_5)_3]H$; $[Ti(OiC_3H_7)_4(OC_2H_5)_2]Mg$; $[Al_2(OiC_4H_9)_8]Mg$; $[Al_2(-secC_4H_9)_6(OC_2H_5)_2]Mg$.

Especially preferred complex metal alcoholates are those which contain magnesium and aluminum and/or silicium in addition.

The metal alcoholate is reacted with the halogen-containing titanium(IV) compound in an inert dispersion medium, in which the alcoholate is first suspended.

As suitable dispersion medium, there may be used an aliphatic or cycloaliphatic hydrocarbon, such as pentane, hexane, heptane, cyclohexane or methylcyclohexane, or furthermore an aromatic hydrocarbon such as benzene, toluene or xylene; alternatively, gasoline or Diesel oil fractions which are carefully liberated from oxygen, sulfur compounds and moisture may be employed.

Subsequently, a halogen-containing titanium(IV) compound is added to the above suspension at a temperature of from 20° to 200° C., preferably 50° to 150° C., and the mixture is agitated at this temperature for 2 to 100 hours.

The halogen-containing titanium(IV) compound is a compound of the formula $TiX_n(OR^1)_{4-n}$, in which n is from 1 to 4 and X is chlorine or bromine, and $R^1$ is a hydrocarbon radical, preferably an alkyl, aryl or aralkyl radical having from 1 to 12, preferably 1 to 8, carbon atoms, especially a linear or branched alkyl radical having from 1 to 8 carbon atoms, for example $TiCl_4$, $TiCl_3(O-n-C_3H_7)$, $TiCl_2(O-n-C_3H_7)_2$, $TiCl(O-n-C_3H_7)_3$, $TiCl_2(O-i-C_3H_7)_2$, $TiCl_3(O-i-C_3H_7)$, $TiCl_3(O-CH_2C_6H_5)$, $TiCl_2(O-CH_2C_6H_5)_2$, $TiCl_3(O-i-C_4H_9)$ or $TiCl_2(O-i-C_4H_9)_2$. Titanium tetrachloride, $TiCl_2(O-i-C_3H_7)_2$ and $TiCl_3(O-i-C_3H_7)$ are especially preferred.

The molar ratio of metal alcoholate to titanium compound is from 1:0.5 to 1:25, preferably 1:1 to 1:5.

After the reaction, the solids insoluble in hydrocarbons (component a) are separated from the reaction medium and washed with the dispersion medium until no halogen can be detected any more in the washing liquid.

Subsequently, component a is suspended in the same or another dispersion medium of the above kind, and reacted with an acid halide of the main groups III and-/or IV and/or the subgroup IV of the Periodic Table of the elements, for example $BF_3$, $BCl_3$, $BBr_3$, $BI_3$, $AlCl_3$, $AlBr_3$, $SiCl_4$, $SiBr_4$, $GeCl_4$, $TiCl_4$, $ZrCl_4$, $ZrBr_4$. Preferred are the acid chlorides, especially the compounds $BCl_3$, $AlCl_3$, $SiCl_4$ and $ZrCl_4$.

The molar ratio for the reaction of component a with the acid halide is from 1:0.1 to 1:20, preferably 1:0.5 to 1:5, relative to the metal of the initial metal alcoholate, that is, 1 mol of the initial metal alcoholate is reacted with 0.2 to 20, preferably 0.5 to 5, mols of acid halide.

The reaction is carried out with agitation at a temperature of from 0° to 200° C., preferably 25° to 120° C., and it takes about ½ to 100, preferably 2 to 24, hours.

The acid halide may be added to component a in one portion; it is however recommended to feed it in in doses within 1 to 10 hours. The optimum dosage time depends on the size of the batch.

The component A so obtained can be used then directly for the polymerization; advantageously, however, the soluble products formed in the reaction of component a with the acid halide are eliminated before by washing with the dispersion medium.

Depending on the reaction conditions, component A contains an amount of from 0.1 to 10 weight % of titanium. For the polymerization, it is applied either in the form of a suspension or after elimination of the dispersion medium and drying, together with component B.

Component B is an organic compound of a metal of main group I, II or III of the Periodic Table, preferably organo-aluminum compounds.

Suitable organo-aluminum compounds are the reaction products of aluminum trialkyls or aluminum dialkyl hydrides the alkyl radicals of which have from 1 to 16 carbon atoms with dienes having from 4 to 20 carbon atoms. Preferred are reaction products of aluminum trialkyls or aluminum dialkyl hydrides, the alkyl radicals of which contain from 4 to 8 carbon atoms, with phellandrene or a diene of the formula

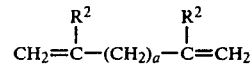

in which $R^2$ is hydrogen, an alkyl radical, an alkenyl radical having a non-terminal double bond, or a mononuclear aryl radical, and a is zero or 1. Examples of such dienes are 1,4-butadiene, isoprene, 2-phenylbutadiene, 1,4-pentadiene, 1,3-pentadiene, myrcene. Especially recommended are the reaction products of $Al(i-C_4H_9)_3$ or $Al(i-C_4H_9)_2H$ with isoprene, examples of which are compounds of the formula

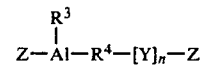

in which Y is a

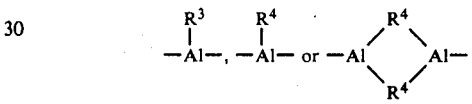

group, Z is hydrogen, an isobutyl group, a dihydro-isoprenyl group or an oligomer of this group, $R^3$ is an isobutyl radical, $R^4$ is a tetrahydro-isoprenyl radical and n is an integer of from 1 to 20, or compounds of the formula

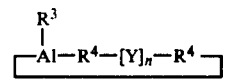

in which Y, $R^3$, $R^4$ and n are as defined above. The ratio of the $C_5$ radicals to the $C_4$ radicals in the reaction products of $Al(i-C_4H_9)_3$ or $Al(i-C_4H_9)_2H$ with isoprene may be generally from 0.25 to 10, preferably, it is from 1 to 4. Especially preferred is the use of a compound of this kind which is available on the market under the common name "aluminumisoprenyl".

Furthermore, there are suitable as component B chlorine-containing organo-aluminum compounds such as dialkylaluminum monochlorides of the formula $R^5_2AlCl$ or alkylaluminum sesquichlorides of the formula $R^5_3Al_2Cl_3$, in which formulae $R^5$ is a hydrocarbon radical having from 1 to 16 carbon atoms, preferably an alkyl radical having from 1 to 16, especially 2 to 4, carbon atoms, for example: $(C_2H_5)_2AlCl$, $(i-C_4H_9)_2AlCl$, $(C_2H_5)_3Al_2Cl_3$.

As component B, there are especially advantageously used aluminum-trialkyls of the formula $AlR^5_3$ or aluminum-dialkyl hydrides of the formula $AlR^5_2H$, in which formulae $R^5$ is as defined above, for example $Al(C_2H_5)_3$, $Al(C_2H_5)_2H$, $Al(C_3H_7)_3$, $Al(i-C_4H_9)_3$, $Al(i-C_4H_9)_2H$.

The titanium(IV) compound of component A is advantageously converted to the polymerization-active low valency state by means of the organo-metal compound (component B) during the polymerization at a temperature of from 20° to 150° C., preferably 60° to 140° C.

Alternatively, component A may be treated before the polymerization with an organo-metal compound, and subsequently applied in the polymerization. This treatment is carried out at a temperature of from 20° to 150° C., preferably 25° to 120° C., at a molar ratio of organo-metal compound to titanium compound of from 0.2:1 to 3:1, preferably 0.5:1 to 2:1, expressed as metal:-titanium. When a chlorine-containing organo-metal compound is used, it is however recommended to wash the reaction product obtained with fresh dispersion medium. Subsequently, component A is activated with further organo-metal compound at a temperature of from 20° to 150° C.

With the use of the catalyst of the invention, at least one 1-olefin of the formula $R^6$-CH=CH$_2$ is polymerized in which formula $R^6$ is hydrogen or a linear or branched alkyl radical having from 1 to 10, preferably 1 to 8, carbon atoms. Examples are ethylene, propylene, butene-(1), hexene-(1), 4-methylpentene-(1) and octene-(1). Preferably, ethylene is polymerized per se or in the form of a mixture of at least 70 weight % of ethylene and a maximum 30 weight % of another 1-olefin of the above formula, especially ethylene per se or a mixture of at least 90 weight % of ethylene and a maximum 10 weight % of another 1-olefin of the above formula.

The molecular weight of the polymer is adjusted in known manner; preferably, hydrogen is used for this purpose.

Polymerization is carried out in solution, suspension or gaseous phase, continuously or batchwise, at a temperature of from 20° to 200° C., preferably 50° to 150° C. The pressure is from 0.5 to 50 bars; polymerization in the industrially interesting pressure range of from 2 to 25 bars being preferred.

The titanium compound is used in a concentration of from 0.0001 to 0.1, preferably 0.001 to 0.05, millimols per liter of dispersion medium or reactor volume. The organo-metal compound is employed in a concentration of from 0.1 to 5, preferably 0.5 to 4, millimoles per liter of reactor volume. In principle, however, higher concentrations are likewise allowed.

The suspension or solution polymerization is carried out in an inert solvent normally used in the Ziegler low pressure process, such as previously indicated.

Because of its excellent activity, the catalyst of the invention yields polymers having a very low titanium and halogen content, and thus extremely good values in the color stability and corrosion tests. As compared to a catalyst containing the same component a, which however has not been reacted with the acid halide, the catalyst of the invention gives an about 20-fold amount of polymer. Thus, polymerization processes having very high space/time yields can be realized.

Therefore, using the Mg-ethylate-TiCl$_4$ catalyst after-treated with BCl$_3$, polymers having a titanium content of about 0.2 ppm can be obtained. Such polyolefins can thus be applied in fields requiring an extremely low heavy metal content.

EXAMPLES

In the following Examples, a hydrogenated Diesel oil fraction having a boiling range of from 130° to 170° C. was used for the manufacture of the catalyst and the polymerization.

The titanium content of the catalyst is determined by colorimetry (lit.: G. O. Müller, Praktikum der quantitativen chemischen Analyse, 4th ed. (1957), p. 243).

The melt flow index is determined according to German Industrial Standard DIN 53 735 (E).

Polymerization is carried out in a 1.5 liter laboratory autoclave, in 0.75 liter of the above Diesel oil fraction, at a temperature of 85° C., within the reaction time of 2 hours, and under a maximum polymerization pressure of 21 bars. The polymers obtained are isolated by filtration of the suspension, and subsequently dried at 80° C. in a vacuum drying cabinet.

Examples 1 to 4 describe the preparation of component a, Examples 5 to 18 the manufacture of component A from component a, and Examples 19 to 39 the polymerization by means of component A prepared in accordance with this invention.

EXAMPLE 1

11.4 g (0.1 mol) of Mg(OC$_2$H$_5$)$_2$ are suspended in 100 ml of Diesel oil, and 37.8 g (0.2 mol) of TiCl$_4$ are added. The suspension is agiatated for 1 hour at 130° C. Subsequently, the precipitate is filtered off under N$_2$, and thoroughly washed with Diesel oil. According to the analysis, the component a1 so obtained contains 66 g Ti/kg of solids
175 g Mg/kg of solids
576 g Cl/kg of solids

EXAMPLE 2

11.4 g of Mg(OC$_2$H$_5$)$_2$ are suspended in 100 ml of Diesel oil and 18.9 g (0.1 mole) of TiCl$_4$ are added. The suspension is agitated for 2 hours at 130° C. Subsequently, the precipitate is filtered off under N$_2$, and thoroughly washed with Diesel oil. According to the analysis, the component a2 contains 93 g Ti/kg of solids
140 g Mg/kg of solids
511 g Cl/kg of solids

EXAMPLE 3

21.4 g (0.15 mole) of magnesium-isopropylate are suspended in 150 ml of Diesel oil, and 28.4 g (0.15 mole) of TiCl$_4$ are added. The suspension is agitated for 8 hours at 25° C. Subsequently, the precipitate is filtered off under N$_2$, and thoroughly washed with Diesel oil. According to the analysis, the component a3 prepared in this manner contains 126 g Ti/kg of solids
77 g Mg/kg of solids
350 g Cl/kg of solids

EXAMPLE 4

186.6 g (1.66 mols) of Mg(OC$_2$H$_5$)$_2$, 176.6 g (0.834 mol) of Al(OiC$_3$H$_7$)$_3$ and 474 g (1.66 mols) Ti(OiC$_3$H$_7$) are suspended in 1.4 liters of Diesel oil. 633.2 g (3.32 mols) of TiCl$_4$ are dropwise added within 2 hours at 80° C. with agitation. The suspension is agitated for 8 hours at 80° C. The precipitate is filtered off and thoroughly washed with Diesel oil until the filtrate is free from halogen. Thereafter, the suspension is adjusted to a volume of 2.5 liters by adding Diesel oil. It then contains 0.8 mol of titanium. The solids (component a4) contains in accordance with the analysis:

184 g Ti/kg of solids
71 g Mg/kg of solids
318 g Cl/kg of solids

EXAMPLE 5

0.05 mol of $SiCl_4$ is added to 0.1 mol (relative to Mg) of component a1 in 200 ml of Diesel oil, and the mixture is agitated for 8 hours at 60° C. The solids insoluble in Diesel oil are filtered off under $N_2$ and washed with Diesel oil until the filtrate is free from halogen. According to the analysis, the catalyst component A1 contains:
3.2 g Ti/kg of solids
204.2 g Mg/kg of solids
608.7 g Cl/kg of solids

EXAMPLES 6 TO 16

The further catalyst components A are prepared as described in Example 5. Starting compounds and conditions of preparation are listed in Table I.

EXAMPLE 17

A solution of 10 g of $BCl_3$ (85.4 mmols) in 100 ml of Diesel oil is added dropwise with agitation at 25° C. and within 60 minutes to 100 ml of the suspension of component a4 (80 mmols of Ti). Subsequently, the batch is agitated for 2 hours at 25° C., the precipitate is filtered off and washed with Diesel oil until the filtrate is free from halogen. Thereafter, the volume of the suspension is adjusted to 200 ml by adding Diesel oil. The suspension contains 2 mmols of titanium compound (component A13).

EXAMPLE 18

50 ml of $SiCl_4$ (0.436 mol) are added dropwise with agitation at 50° C. and within 60 minutes to 200 ml of the above suspension of component a4. Subsequently, agitation is continued for 5 hours at 50° C., and the precipitate is filtered off and washed with Diesel oil until the filtrate is free from halogen. The volume of the suspension is then adjusted to 250 ml by adding Diesel oil. The suspension contains 27.5 mmols of titanium compound (component A14).

EXAMPLE 19

750 ml of Diesel oil are introduced into a 1.5 liter autoclave and flushed with $N_2$. Subsequently, 1 mmol of Al-tri-isobutyl and catalyst component A1 containing 0.001 mg-atom Ti is added. The pressure is then adjusted to 4.5 bars of $H_2$, and ethylene is added in such a manner that a pressure of 21 bars is established. After polymerization for 2 hours at 85° C., the reaction is stopped and the polymer is filtered and dried. 172 g of polyethylene having an $i_5$ value of 0.7 g/10 min. are obtained. Per mmol of titanium compound, 172,000 g of polyethylene are formed, that is, per gram of titanium, 3,595,000 g of polyethylene are obtained. Per gram of solids, 11,500 g of polyethylene are produced.

EXAMPLES 20 to 39 and COMPARATIVE EXAMPLES A to E

The further polymerizations are carried out as described in Example 19. The differing conditions and results are listed in Table II.

Table 1

| Example | Component A | Starting component a | mol | acid chloride | (mmols) | Reaction temp. °C. | wt.-% Ti | wt.-% Mg | wt.-% Cl |
|---|---|---|---|---|---|---|---|---|---|
| 6  | A 2  | a 1 | 0.1 | $SiCl_4$ | 25  | 60 | 0.36 | 20.0 | 58.9 |
| 7  | A 3  | a 1 | 0.1 | $BCl_3$  | 66  | 25 | 0.89 | 17.7 | 55.7 |
| 8  | A 4  | a 1 | 0.1 | $BCl_3$  | 25  | 25 | 2.3  | 17.8 | 54.8 |
| 9  | A 5  | a 1 | 0.1 | $AlCl_3$ | 66  | 85 | 1.4  | 19.5 | 64.1 |
| 10 | A 6  | a 2 | 0.1 | $BCl_3$  | 50  | 25 | 1.4  | 15.4 | 47.5 |
| 11 | A 7  | a 2 | 0.1 | $SiCl_4$ | 50  | 60 | 0.32 | 18.7 | 54.5 |
| 12 | A 8  | a 2 | 0.1 | $AlCl_3$ | 66  | 85 | 0.91 | 16.5 | 75.9 |
| 13 | A 9  | a 3 | 0.1 | $SiCl_4$ | 50  | 60 |      |      |      |
| 14 | A 10 | a 1 | 0.1 | $ZrCl_4$ | 20  | 85 | 1.26 | 15.4 | 53.0 |
| 15 | A 11 | a 1 | 0.1 | $ZrCl_4$ | 50  | 85 | 0.88 | 10.6 | 49.8 |
| 16 | A 12 | a 1 | 0.1 | $ZrCl_4$ | 100 | 85 | 0.37 | 7.2  | 49.6 |

Table II

| Example No. | Catalyst component A (mg-atom Ti) | Aluminumalkyl | Hydrogen (bars) | Polymerization pressure (bars) | yield (g) | Catalyst yield (kg/gTi) | melt flow index $i_5$(g/10 min) |
|---|---|---|---|---|---|---|---|
| 20 | A 2 (0.005)   | ATIB  | 4.5 | 21 | 211 | 882  | 2.4 |
| 21 | A 3 (0.001)   | ATIB  | 4.5 | 21 | 261 | 5455 | 3.0 |
| 22 | A 4 (0.005)   | ATIB  | 4.5 | 21 | 195 | 815  | 1.1 |
| 23 | A 5 (0.0025)  | ATIB  | 4.5 | 21 | 218 | 1822 | 2.4 |
| 24 | A 5 (0.0025)  | ATE   | 4.5 | 21 | 185 | 1547 | 1.8 |
| 25 | A 6 (0.01)    | ATIB  | 4.5 | 21 | 304 | 635  | 3.0 |
| 26 | A 6 (0.005)   | ATE   | 4.5 | 21 | 158 | 660  | 4.2 |
| 27 | A 7 (0.0025)  | ATIB  | 4.5 | 21 | 166 | 1388 | 1.0 |
| 28 | A 7 (0.004)   | ATE   | 4.5 | 21 | 269 | 1406 | 1.7 |
| 29 | A 8 (0.004)   | ATIB  | 4.5 | 21 | 278 | 1453 | 3.6 |
| 30 | A 8 (0.002)   | ATE   | 4.5 | 21 | 195 | 2038 | 2.8 |
| 31 | A 9 (0.005)   | ATIB  | 4.5 | 21 | 156 | 650  | 1.5 |
| 32 | A 10 (0.006)  | ATIB  | 4.5 | 21 | 206 | 718  | 1.5 |
| 33 | A 10 (0.015)  | IPRA  | 4.5 | 21 | 210 | 293  | 0.6 |
| 34 | A 11 (0.01)   | ATIB  | 4.5 | 21 | 176 | 368  | 0.6 |
| 35 | A 11 (0.02)   | IPRA  | 8.0 | 21 | 230 | 240  | 0.2 |
| 36 | A 12 (0.007)  | ATE   | 8.0 | 21 | 220 | 657  | 0.1 |
| 37 | A 12 (0.005)  | IPRA  | 8.0 | 21 | 160 | 669  | 0.5 |
| 38 | A 13 (0.0015) | ADIBH | 6.0 | 16 | 176 | 2450 | 0.8 |
| 39 | A 14 (0.011)  | ADIBH | 6.0 | 16 | 128 | 243  | 0.4 |
| Example | Component a | Aluminum- | hydrogen | Polymerization- | yield | Catalyst yield | melt flow index |

Table II-continued

| No. | (mg-atom Ti) | alkyl | (bars) | pressure (bars) | (g) | (kg/gTi) | i₅(g/10 min) |
| --- | --- | --- | --- | --- | --- | --- | --- |
| comparison A | 0.02 | a 1 | ATIB | 4.5 | 21 | 205 | 285 | 6.3 |
| comparison B | 0.03 | a 2 | ATIB | 4.5 | 21 | 173 | 121 | 4.5 |
| comparison C | 0.02 | a 3 | ATIB | 4.5 | 21 | 236 | 247 | 0.7 |
| comparison D | 0.02 | a 3 | ATE | 4.5 | 21 | 240 | 251 | 2.0 |
| comparison E | 0.032 | a 4 | ADIBH | 6.0 | 16 | 124 | 81 | 0.5 |

ATE = Aluminumtriethyl
ATIB = Alumiunumtriisobutyl
IPRA = Isoprenylaluminum
ADIBH = Aluminumdiisobutyl hydride

What is claimed is:

1. A process for the production of a catalyst consisting of a compound containing a transition metal and an activator, which comprises reacting a halogen-containing titanium compound of the formula $TiX_n(OR_1)_{4-n}$, in which n is from 1 to 4, X is chlorine or bromine and $R_1$ is a hydrocarbon radical of from 1 to 12 carbon atoms with a metal alcoholate of the formula $[Me^1{}_x(OR)_v\text{-}]Me^2{}_yMe^3{}_zH_w$, in which $Me^1$, $Me^2$, and $Me^3$ are the same or not all the same and each is a metal of main group I, II, III or IV or subgroup I, II, IV or V of the Periodic Table of the elements, R is a hydrocarbon radical of from 1 to 20 carbon atoms, x is an integer of from 1 to 5; y is an integer of from 0 to 2; z is an integer of from zero to 2; v is an integer of from 2 to 8; and w is either zero or 1, with the proviso that (valency of $Me^1$)·x + (valency of $Me^2$)·y + (valency of $Me^3$)·z + w = v;

washing the solid reaction product which is insoluble in hydrocarbons in an inert dispersion medium until halogen can no longer be detected in the dispersion medium after washing, reacting the washed product with an acid halide of an element of main group III or IV or subgroup IV of the Periodic Table, and reacting the acid halide reaction product with an organoaluminum compound.

2. A process for the production of a catalyst consisting of a compound containing a transition metal and an activator, which comprises reacting a halogen-containing titanium compound of the formula $TiX_n(OR_1)_{4-n}$, in which n is from 1 to 4, X is chlorine or bromine and $R_1$ is a hydrocarbon radical of from 1 to 12 carbon atoms with a metal alcoholate of the formula $[Me^1{}_x(OR)_v\text{-}]Me^2{}_yMe^3{}_zH_w$, in which $Me^1$, $Me^2$ and $Me^3$ are the same or not all the same and each is lithium, sodium, potassium, magnesium, calcium, aluminum, silicon, titanium or zirconium, R is a hydrocarbon radical of from 1 to 20 carbon atoms, x is an integer of from zero to 2; v is an integer of from 2 to 8; and w is either zero or 1, with the proviso that (valency of $Me^1$)·x + (valency of $Me^2$)·y + (valency of $Me^3$)·z + w = v;

washing the solid reaction product which is insoluble in hydrocarbons in an inert dispersion medium until halogen can no longer be detected in the dispersion medium after washing, reacting the washed product with an acid halide selected from the group consisting of $BF_3$, $BCl_3$, $BBr_3$, $BI_3$, $AlCl_3$, $AlBr_3$, $SiCl_4$, $SiBr_4$, $GeCl_4$, $TiCl_4$, $ZrCl_4$, and $ZrBr_4$ and reacting the acid halide reaction product with an organo-aluminum compound.

3. A catalyst prepared according to the process as defined in claim 1.

4. A catalyst prepared according to the process as defined in claim 2.

5. A process as defined in claim 2, wherein $Me^1$, $Me^2$ and $Me^3$ are the same or different and each is magnesium, aluminum, silicon, titanium or zirconium.

6. A catalyst prepared according to the process as defined in claim 5.

7. A process as defined in claim 1 or 2, wherein R is alkyl of from 1 to 20 carbon atoms.

8. A catalyst prepared according to the process as defined in claim 7.

9. A process as defined in claim 7, wherein R is alkyl of from 1 to 6 carbon atoms.

10. A catalyst prepared according to the process as defined in claim 9.

11. A process as defined in claim 1 or 2, wherein the metal alcoholate is $Mg(OC_2H_5)_2$, $Mg(OiC_3H_7)_2$, $Mg(OiC_4H_9)_2$ or Mg phenolate.

12. A catalyst prepared according to the process as defined in claim 11.

13. A process as defined in claim 1 or 2, wherein the acid halide is selected from the group consisting of $BCl_3$, $AlCl_3$, $SiCl_4$ and $ZrCl_4$.

14. A catalyst prepared according to the process as defined in claim 13.

15. A process as defined in claim 1 or 2, wherein the molar ratio of metal alcoholate to titanium compound is of from 1:0.5 to 1.25, the reaction between the metal alcoholate and titanium compound is at a temperature of from 20° to 200° C. for a time of from 2 to 100 hours, the inert dispersion medium is selected from the group consisting of aliphatic hydrocarbons, cycloaliphatic hydrocarbons, aromatic hydrocarbons, gasoline which is free of oxygen, sulfur compounds and moisture and diesel oil fractions which are free from oxygen, sulfur compounds and moisture, the molar ratio of the metal of the product of the reaction of alcoholate with titanium compound to the acid halide is of from 1:0.1 to 1:20, and the reaction with the acid halide is at a temperature of from 0° to 200° C. for a time of about one-half to 100 hours.

16. A catalyst prepared according to the process as defined in claim 15.

17. A process as defined in claim 15, wherein the molar ratio of metal alcoholate to titanium compound is of from 1:1 to 1:5, the reaction between the metal alcoholate and titanium compound is at a temperature of from 50° to 150° C., the dispersion medium is selected from the group consisting of pentane, hexane, heptane, cyclohexane, methylcyclohexane, benzene, toluene and xylene, the molar ratio of the metal of the product of the reaction of alcoholate with titanium compound to the acid halide is of from 1:0.5 to 1:5, and the reaction with the acid halide is at a temperature of from 25° to 120° C. for a time of 2 to 24 hours.

18. A catalyst prepared according to the process as defined in claim 17.

19. A process as defined in claim 1 or 2, wherein the organo-aluminum compound is a reaction product of an aluminum trialkyl, each alkyl of which is of from 1 to 16 carbon atoms, with a diene of from 4 to 20 carbon atoms; a reaction product of an aluminum dialkyl hydride, each alkyl radical of which is of from 1 to 16 carbon atoms, with a diene of from 4 to 20 carbon atoms; a dialkyl aluminum monochloride of the formula $R^5_2AlCl$ or an alkylaluminum sesquichloride of the formula $R^5_3Al_2Cl_3$, $R^5$ being a hydrocarbon radical of from 1 to 16 carbon atoms; an aluminum trialkyl of the formula $AlR^5_3$; or an aluminum dialkyl hydride of the formula $AlR^5_2H$.

20. A catalyst prepared according to the process as defined in claim 19.

* * * * *